United States Patent
Liu et al.

(10) Patent No.: US 7,885,455 B2
(45) Date of Patent: Feb. 8, 2011

(54) METHOD OF COMBINING IMAGES OF MULTIPLE RESOLUTIONS TO PRODUCE AN ENHANCED ACTIVE APPEARANCE MODEL

(75) Inventors: Xiaoming Liu, Schenectady, NY (US); Frederick Wilson Wheeler, Niskayuna, NY (US); Peter Henry Tu, Schenectady, NY (US)

(73) Assignee: UTC Fire & Security Americas Corporation, Inc, Bradenton, FL (US)

( * ) Notice: Subject to any disclaimer, the term of this patent is extended or adjusted under 35 U.S.C. 154(b) by 978 days.

(21) Appl. No.: 11/650,213

(22) Filed: Jan. 5, 2007

(65) Prior Publication Data

US 2007/0292049 A1  Dec. 20, 2007

Related U.S. Application Data

(60) Provisional application No. 60/792,300, filed on Apr. 14, 2006.

(51) Int. Cl.
- G06K 9/62 (2006.01)
- G06K 9/48 (2006.01)
- G06K 9/68 (2006.01)

(52) U.S. Cl. .................. 382/160; 382/199; 382/215; 382/218

(58) Field of Classification Search .............. 382/154, 382/160, 218, 215, 199
See application file for complete search history.

(56) References Cited

U.S. PATENT DOCUMENTS 6,272,247 B1 * 8/2001 Manickam et al. .......... 382/217
7,062,093 B2 * 6/2006 Steger ........................ 382/216
2008/0199044 A1 * 8/2008 Tsurumi ..................... 382/103

OTHER PUBLICATIONS

Cootes et al, Multi-Resolution Search with Active Shape Models, 1994, IEEE, pp. 610-612.*
Cootes et al, Active Shape Models: Evaluation of a Multi-Resolution Method for Improving Image Search, 1994, Proc. British Machine Vision Conference (vol. 1), pp. 327-336.*
Baker et al., "Lucas-Kinade 20 years on: A unifying framework," Int. J. Computer Vision, 56(3): 221-255, Mar. 2004.
Baker et al., "Automatic construction of active appearance models as an image coding problem," IEEE TRans. on Pattern Analysis and Machine Intelligence, 26(10): 1380-1384, Oct. 2004.
Chang et al., "Face recognition using 2D and 3D facial data," in Proc. Multimodal User Authentication Workshop, Dec. 2003.
Cootes et al., "A trainable method of parametric shape description," Proc. 2nd British Machine Vision Conference, Glasgow, UK, pp. 54-61, Springer, Sep. 1991.

(Continued)

Primary Examiner—Kathleen S Yuan
(74) Attorney, Agent, or Firm—Armstrong Teasdale LLP

(57) ABSTRACT

A method of producing an enhanced Active Appearance Model (AAM) by combining images of multiple resolutions is described herein. The method generally includes processing a plurality of images each having image landmarks and each image having an original resolution level. The images are down-sampled into multiple scales of reduced resolution levels. The AAM is trained for each image at each reduced resolution level, thereby creating a multi-resolution AAM. An enhancement technique is then used to refine the image landmarks for training the AAM at the original resolution level. The landmarks for training the AAM at each level of reduced resolution is obtained by scaling the landmarks used at the original resolution level by a ratio in accordance with the multiple scales.

20 Claims, 12 Drawing Sheets

OTHER PUBLICATIONS

Dedeoglu et al., "Resolution-aware fitting of active appearance models to low-resolution images," Proceedings of the 9th European Conference on Computer Vision, Springer, May 2006.
Doretto, "Modeling dyamic scenes with active appearance," IEEE Computer Vision and Pattern Recognition, San Diego, CA, vol. 1, pp. 66-73, 2005.
Gross et al., "Generic vs. person specific active appearance models," Images and Vision Computing, 23(11): 1080-1093, Nov. 2005.
Ziotva et al., "Image Registration Methods: A Survey," J. Image and Vision Computing, 21(11): 977-1000, 2003.
Liu et al., "Face Model Fitting on Low Resolution Images," Biometric Symposium 2006, Sep. 19-21, 2006.

* cited by examiner

Shape Model

Appearance Model

The AAM enhancement method

The 6th and 7th Shape Bias

The 1st and 4th Appearance basis

The compactness of the appearance model (left) and the shape model (right) during the enhancement process Multi-resolution AAMs The fitting performance of the AAM

FIG. 9

Average fitting speed using the AAM using manual landmarks vs. enhanced landmarks

| Pert. | 21R0 | 124R0 | 534R0 | 21R1 | 124R1 | 534R1 | 21R13 | 124R13 | 534R13 |
|---|---|---|---|---|---|---|---|---|---|
| 0 | 0.30 | 0.39 | 0.52 | 0.15 | 0.20 | 0.26 | 0.12 | 0.16 | 0.23 |
| 1/16 | 1.17 | 2.07 | 3.68 | 0.36 | 0.60 | 0.95 | 0.24 | 0.34 | 0.46 |
| 1/8 | 5.25 | 8.67 | 13.94 | 1.14 | 1.90 | 3.29 | 0.58 | 0.88 | 1.29 |

METHOD OF COMBINING IMAGES OF MULTIPLE RESOLUTIONS TO PRODUCE AN ENHANCED ACTIVE APPEARANCE MODEL

CROSS REFERENCE TO RELATED APPLICATION

This application claims the benefit of U.S. Provisional Application No. 60/792,300, filed Apr. 14, 2006, entitled "Face Model Fitting On Low Resolution Images," the entire contents of which is hereby incorporated by reference.

FEDERAL RESEARCH STATEMENT

This invention was made with U.S. Government support under Contract No. 2005-1J-CX-K060 awarded by the U.S. Department of Justice. The U.S. Government has certain rights in this invention.

BACKGROUND OF THE INVENTION

The present disclosure generally relates to enhancement methods for Active Appearance Models (AAM), and more particularly to a multi-resolution AAM fitting method for low-resolution images.

Model-based image alignment is a fundamental problem in computer vision. Since the early 1990's, AAM have been a very popular method of image alignment. For facial images analysis, face alignment/fitting using AAM are receiving more attention among those skilled in the art of computer vision technology, because it enables facial feature detection and pose rectification. However, most of the existing work focuses on fitting AAM to high quality images. The heightened awareness of the need to monitor public spaces for terrorist and criminal activity has lead to a proliferation of surveillance cameras in public venues. Unfortunately, many of these cameras produce low-resolution images. Therefore, identifying individuals and objects using these low-resolution images can be difficult. To overcome this problem, there exists a need for a computer vision enhancement system that is capable of low-resolution image fitting and alignment using AAM. How to effectively fit AAM to low-resolution facial images is an important question.

There are two basic components in face alignment using AAM. One is face modeling and the other is model fitting. Given a set of facial images, face modeling is the procedure for training the AAM. AAM are essentially two distinct linear subspaces modeling the image shape and appearance separately. Once the AAM are trained, model fitting refers to the process of fitting the AAM to facial or other images so that the cost function measuring the distance between the image and AAM is minimized. In other words, fitting involves matching the AAM to a facial or other image.

Conventional face modeling directly utilizes the manual labeling of facial landmarks and uses them in training the shape model. However, manual labeling tends to have various errors, which affects the resultant shape model and as well the appearance model.

One requirement for AAM training is the manual labeling of facial landmarks for all training images. This is a time-consuming task that involves manual labeling of image landmarks for all training images. This is not only a time-consuming manual operation, but also a process prone to frequent errors. The frequency of errors may be due to a number of factors including the human factor involved. For example, the same person might have slightly different labeling for the same image when he or she labels it the second time. Also, different people have different labeling for the same image. Another factor is the inherent confusing definition of some landmarks. For example, there is no facial feature to rely on in labeling the landmarks along the outer-boundary of the cheek. Thus, it is hard to guarantee these landmarks correspond to the same physical position under multiple poses.

The error in labeling affects image modeling. In shape modeling, the resultant shape bias models not only the inherent shape variation, but also the error of the labeling, which is not desirable. In the appearance modeling, the appearance bias contains more low frequency information, which is an unfavorable property for model-based fitting.

Furthermore, in fitting AAM to low-resolution images, there is a potential mismatch between the model resolution and the image resolution. Therefore, there persists a need to fit AAM to low-resolution facial images.

BRIEF DESCRIPTION OF THE INVENTION

Disclosed herein are a method, system, and apparatus for an iterative AAM enhancement scheme. The AAM enhancement scheme not only increases the alignment or fitting speed, but also improves the alignment and fitting capability and generates a multi-resolution AAM where the best fitting performance is obtained when the model resolution is similar to the facial image resolution.

In view of the foregoing, a method of combining images of multiple resolutions to produce an enhanced AAM is described. The method generally includes providing a plurality of images each having image landmarks and each image having an original resolution level. The images are then down-sampled into multiple scales of reduced resolution levels. The AAM is trained for each image at each reduced resolution level, thereby creating a multi-resolution AAM. An enhancement technique is then used to refine the image landmarks for training the AAM at the original resolution level. The landmarks for training the AAM at each level of reduced resolution is obtained by scaling the landmarks used at the original resolution level by a ratio in accordance with the multiple scales.

Further in view of the foregoing, a system is described herein for combining digital images of multiple resolution levels to produce an enhanced active appearance model. The system comprises a general purpose computer having a memory; a plurality of digital images residing in the memory, each of the plurality of digital images having image landmarks and each of the plurality of digital images having an original resolution level. The system further comprises first and second processes. The first process residing in the memory, and having instructions to down-sample the digital images into multiple scales of reduced resolution levels. The second process also resides in the memory and contains instructions to align an active appearance model for each reduced resolution levels to create a multi-resolution active appearance model, wherein an enhancement technique is used to refine the image landmarks for aligning the active appearance model at the original resolution level, and wherein the landmarks used for aligning the active appearance model for reduced resolution levels are obtained by scaling the landmarks used at the original resolution levels with a ratio in accordance with the multiple scales.

A method operable in a computer readable medium for combining images of multiple resolutions to produce an enhanced AAM is also provided. The method generally includes processing a plurality of images each having image landmarks and each image having an original resolution level. The images are then down-sampled into multiple scales of reduced resolution levels. The AAM is trained for each image at each reduced resolution level, thereby creating a multi-resolution AAM. An enhancement technique is then used to refine the image landmarks for training the AAM at the original resolution level. The landmarks for training the AAM at each level of reduced resolution is obtained by scaling the landmarks used at the original resolution level by a ratio in accordance with the multiple scales.

In one embodiment, an image processing method where facial modeling and model fitting are iteratively performed based on a training image set is described herein. The iteration starts with the manual labeling of the landmarks and stops when the fitted landmark location does not change significantly. An aspect produces an enhanced AAM that is more compact than the original AAM for both the shape and appearance models.

An image processing method where multi-resolution AAM are used in fitting facial images with various resolutions is also described herein. The best fitting performance is obtained when the model resolution is similar to the facial image resolution.

In another embodiment, model fitting using multi-resolution AAM rather than high-resolution AAM is further described herein. The fitting performance of Multi-resolution AAM is improved over the performance of high-resolution AAM. This improved performance is possible through the iterative process.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a table illustrating the average fitting speed using AAM at various iterations in accordance with an exemplary embodiment of the invention.

DETAILED DESCRIPTION OF THE INVENTION

Figure 1A:
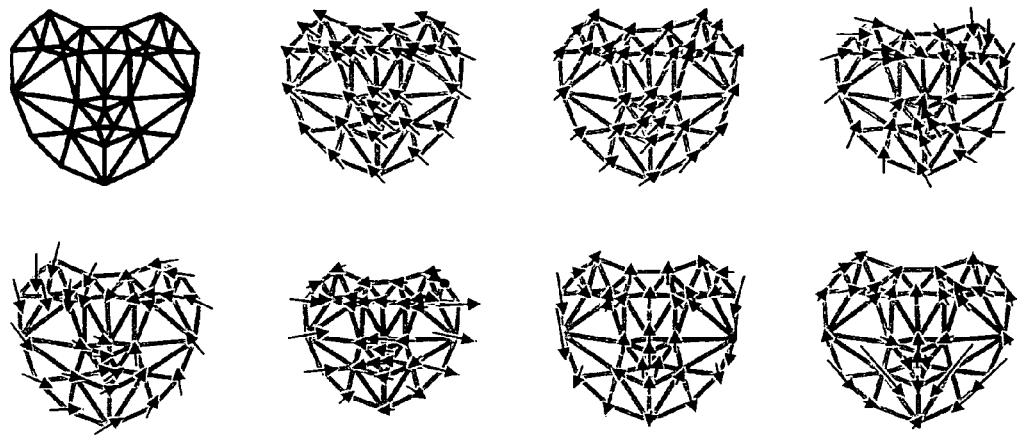
FIG. 1A is a schematic illustration of a shape model.

Embodiments of the present invention will be described hereinafter with reference to the drawings. In the drawings, likewise or corresponding components have the same reference characters allotted.

An AAM is composed of a shape model and an appearance model. The AAM is trained to align images by resolving calculations from both the shape model and the appearance model. Both models are explained in detail below.

The distribution of facial landmarks is modeled as a Gaussian distribution, which is the shape model. The procedure of building a shape model is as follows. Given a face database with M facial images, each of them $I_m$ are manually labeled with a set of 2D landmarks, $[x_i, y_i]$ i=1, 2, . . . , v. The collection of landmarks of one image is treated as one observation for the shape model, $s=[x_1, y_1, x_2, y_2, \ldots, x_v, y_v]^T$. Finally eigenanalysis is applied on the observations set and the resultant linear shape space can represent any shape as:

$$s(P) = s_0 + \sum_{i=0}^{n} p_i s_i$$

where $s_0$ is the mean shape, $s_i$ is the shape bias, and $P=[p_1, p_2, \ldots, p_n]$ is the shape coefficient. The first four shape biases represent the global rotation and translation. Together with other shape bias, a mapping function from the model coordination system to the coordination in the image observation can be defined as $W(x; P)$, where x is the pixel coordinate in the mean shape $s_0$.

Figure 1B:
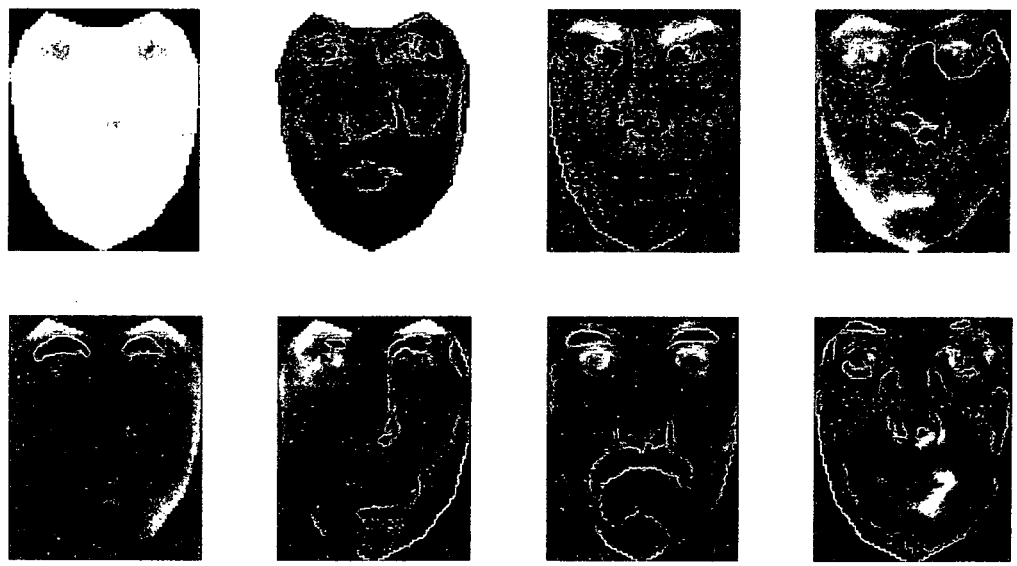
FIG. 1B is an illustration of images from an appearance model.

After the shape model is trained, the appearance model is obtained as follows. Each facial image is warped into the mean shape based on the piece-wise affine transformation between its shape instance and the mean shape. These shape-normalized appearances from all training images are feed into eigenanalysis and the resultant model can represent any appearance as:

$$A(x; \lambda) = A_0(x) + \sum_{i=0}^{m} \lambda_i A_i(x)$$

where $A_0$ is the mean appearance, $A_i$ is the appearance bias, and $\lambda=[\lambda_1, \lambda_2, \ldots, \lambda_n]$ is the appearance coefficient. In an exemplary implementation, the resolution of the appearance model is the same as the resolution of training images. FIG. 1B shows the AAM trained using 534 images of 200 subjects from a face database.

From the modeling side, the AAM generated from the above procedure can synthesize facial image with arbitrary shape and appearance within a certain population. On the other hand, model fitting is used by AAM to explain a facial image by finding the optimal shape and appearance coefficients such that the synthesized image is closer to the image observation as possible. This use of model fitting leads to the cost function used in model fitting:

$$J(P, \lambda) = \sum_{x \in S_0} \|I(W(x; P)) - A(x; \lambda)\|^2$$

which minimizes the mean-square-error between the image warped from the observation I(W(x; P)) and the synthesized appearance model instance A(x; λ).

Traditionally, the above minimization problem is solved by iterative gradient-decent method, which estimate ΔP, Δλ and adds them to P, λ. Algorithms called inverse compositional (IC) method and simultaneously inverse compositional (SIC) methods greatly improve the fitting speed and performance. The basic idea of IC and SIC is that the role of appearance template and input image is switched when computing ΔP, which enables the time-consuming steps of parameter estimation to be pre-computed and outside of the iteration loop.

Figure 2:
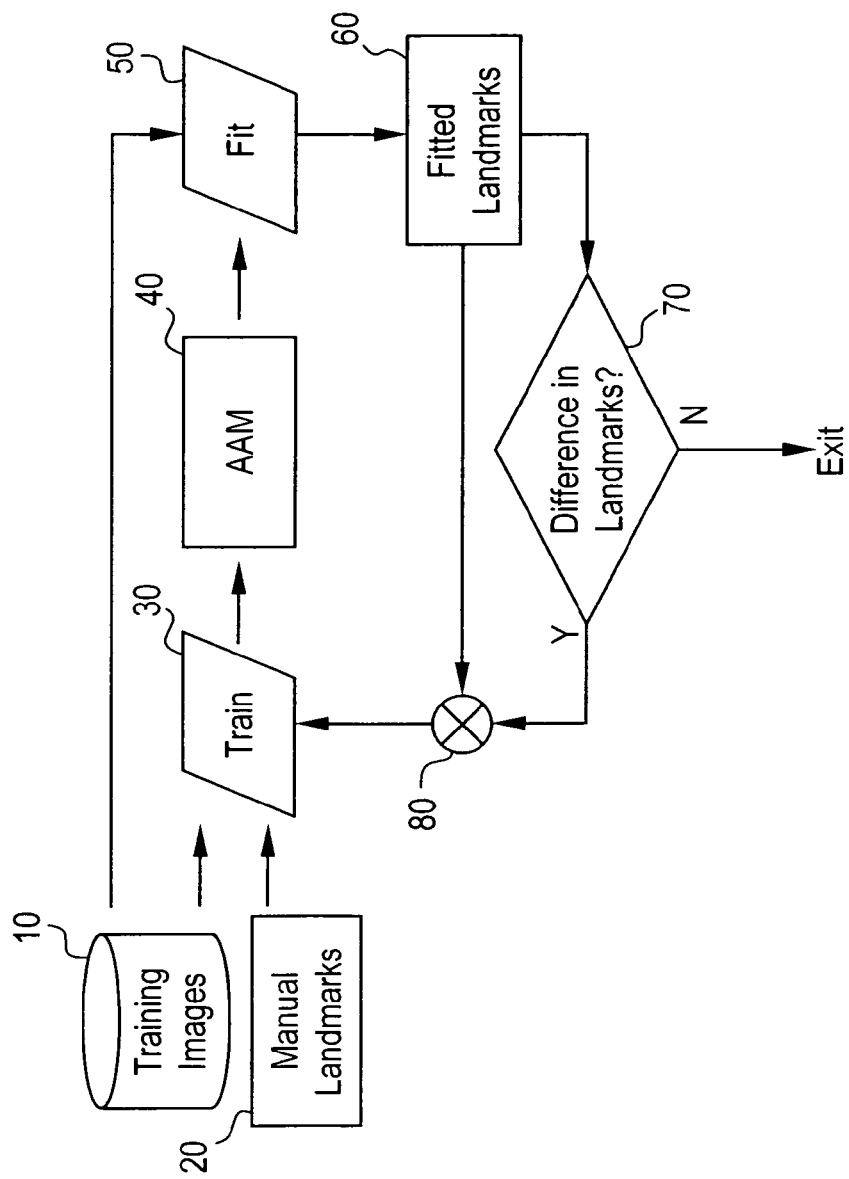
FIG. 2 is a schematic flowchart illustrating an AAM enhancement method in accordance with an exemplary embodiment of the invention.

In an exemplary embodiment, the system and method described herein uses an AAM enhancement method to address the problem of labeling errors in landmarks. This method is illustrated in FIG. 2. Starting with a set of training images 10 and their corresponding manual landmarks 20, an AAM is generated as follows. The training images are fitted 50 in AAM 40 using the SIC algorithm. The initial landmark location for the model fitting is the manual landmarks. Once the fitting is completed 60, differences between the new set of landmarks and pervious set of landmarks are calculated 70. If the difference is above a set threshold, a new iteration 80 of the AAM enhancement method begins and a new set of landmarks is obtained. The iteration 80 continues until there is no significant difference between the landmark set of the current iteration and the previous iteration. In the modeling of each iteration step, the numbers of biases for both the appearance model and the shape model are chosen such that 98% and 99% of energy are preserved respectively.

Figure 3:
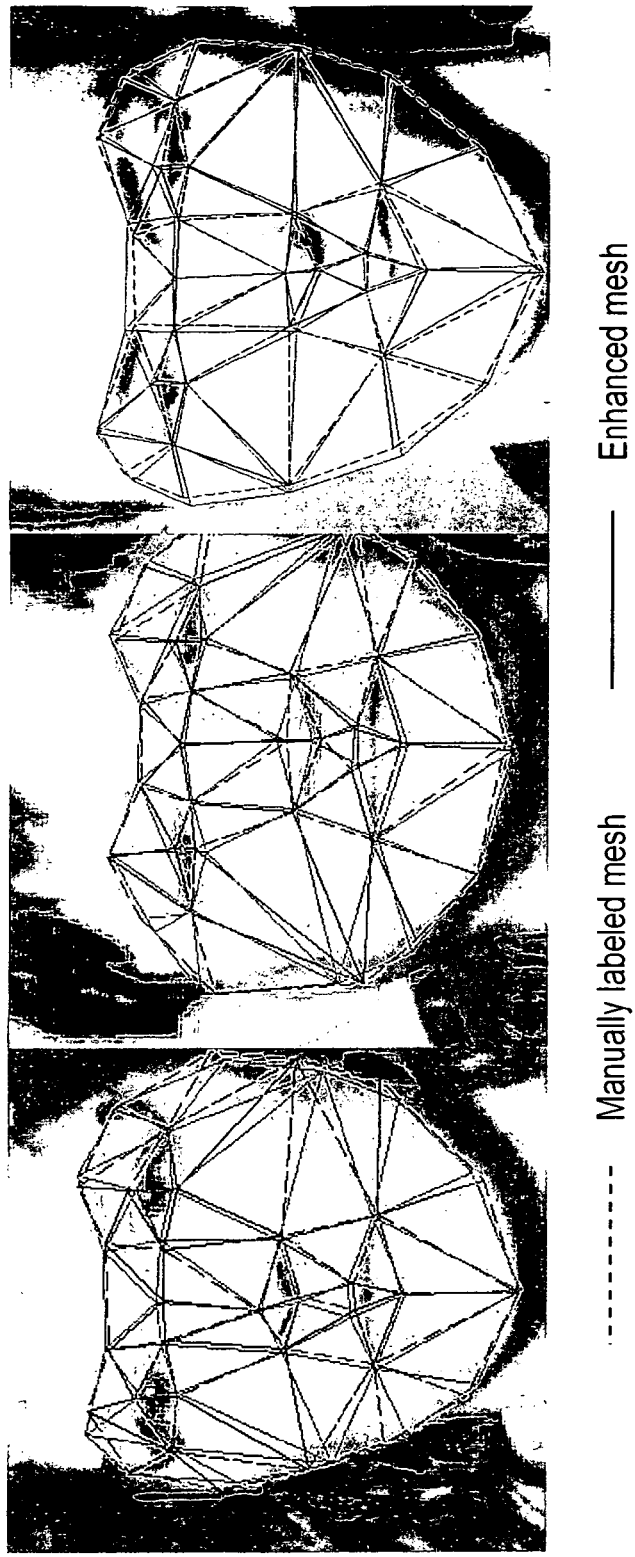
FIG. 3 is an illustration of landmarks applied to facial images.

In an exemplary implementation, given a subset of 534 images from 200 subjects from an image database, the AAM enhancement scheme is implemented. After the enhancement process converges, it is expected that the new set of landmarks will deviate from the manual landmark within different degrees for each image. FIG. 3 shows the two sets of landmarks for three images that are among the ones with the largest amount of deviation. A number of observations can be made from these results, however. First, most of the landmarks with large deviation appear on the boundary of the cheek, which is consistent with the fact that they have inherent ambiguity in definition. Second, most of the landmarks seem to deviate toward the true position. This result is expected given the assumption that people do not make consistent errors during the labeling.

Figure 4:
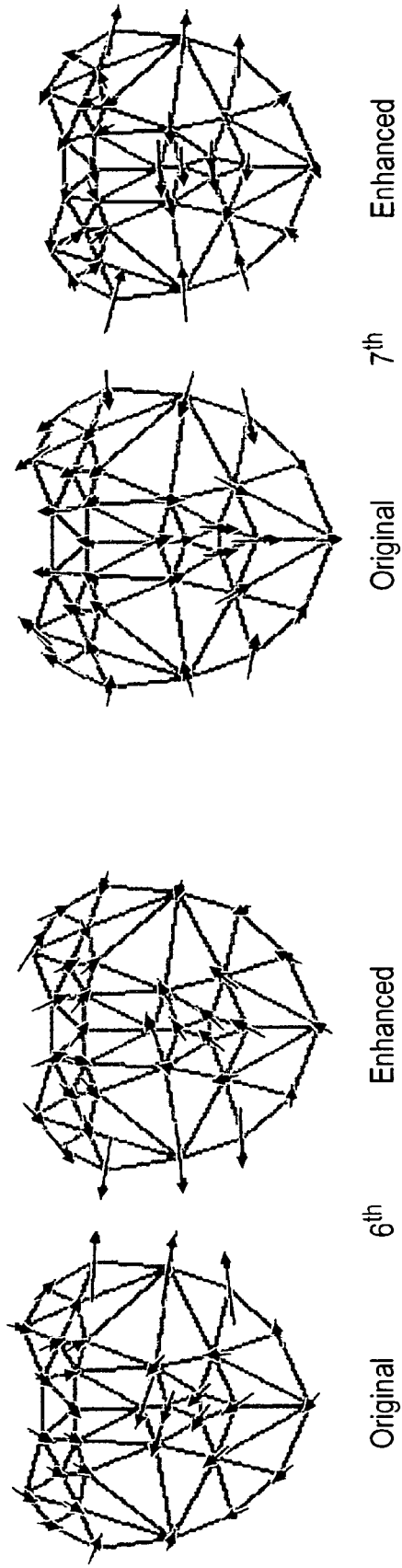
FIG. 4 is an illustration of a facial mesh.
Figure 5:
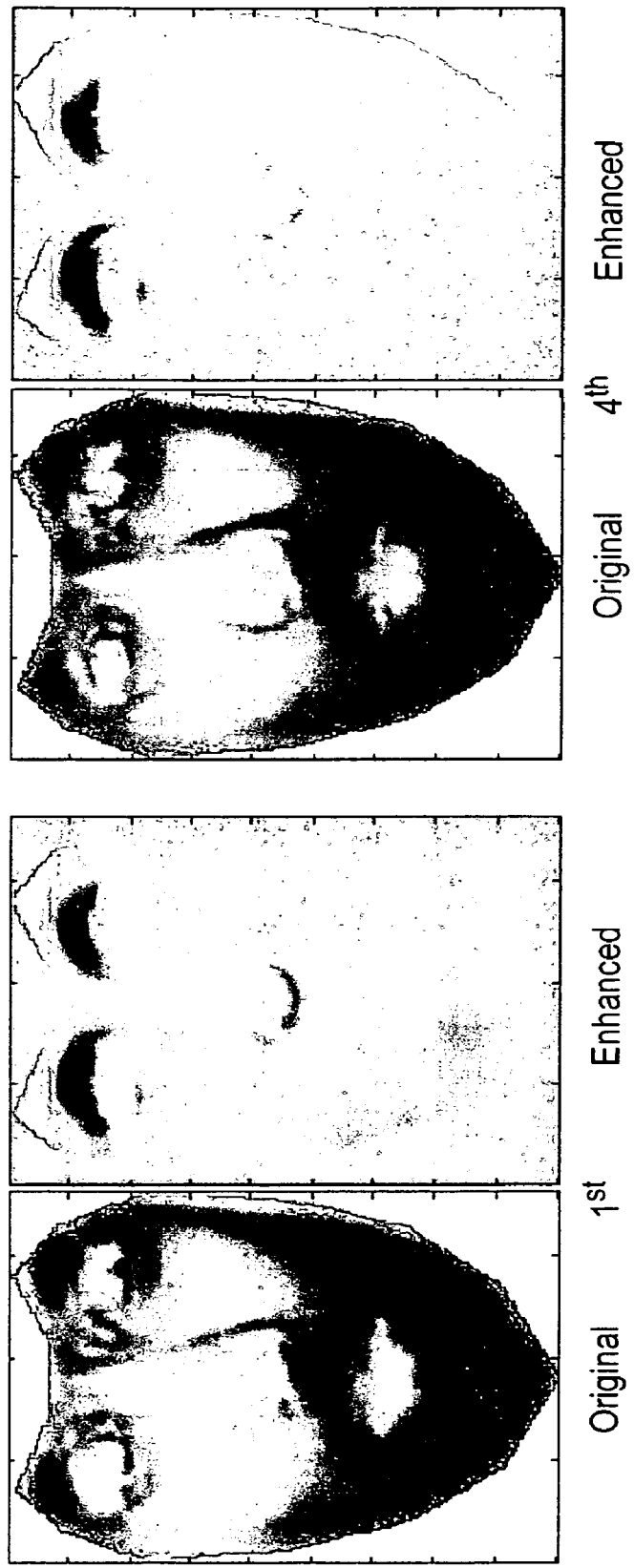
FIG. 5 is an illustration of images used in an appearance bias.

With the refined landmark location, performance of the AAM improves as well. The difference between the $6^{th}$ and $7^{th}$ shape biases shown in FIG. 4, which has relatively larger differences among all shape biases. The variations of landmarks around the boundary of the cheek become more balanced after enhancement. Similarly FIG. 5 shows the difference of the $1^{st}$ and $4^{th}$ appearance bias comparing before and after enhancement. Certain facial areas, such as the left eye boundary of $1^{st}$ bias and the lips of $4^{th}$ bias, display more sharpness after enhancement.

Figure 6:
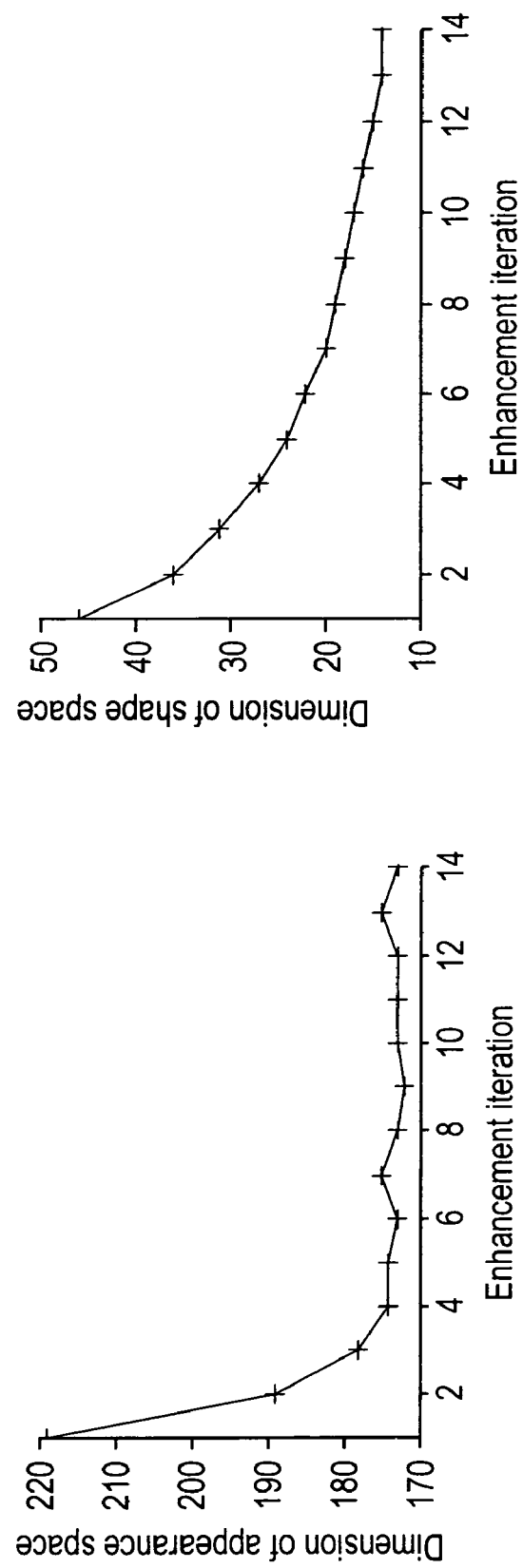
FIG. 6 illustrates graphs showing the compactness of the appearance model and the shape model during an enhancement process.

In addition to the better quality observed in the enhanced AAM bias, another benefit of enhancement is the improved compactness of face models. For example, FIG. 6 plots the dimensionality of the appearance model and the shape model during the iterative enhancement process. Both models use fewer biases to represent the same amount of variation. The improved compactness for the shape model is expected because the variation due to manual label error is removed during the enhancement process. Thus, with less shape bias, the process can focus on modeling only the inherent shape variation.

There are many benefits of a more compact AAM. One benefit is that fewer shape and appearance parameters have to be estimated during model fitting. Thus the minimization process has less chance to be trapped into local minimization loops improving the fitting capability. Another benefit is that the model fitting can be performed faster because the computation cost directly depends on the dimensionality of the shape and appearance models.

In another exemplary embodiment, the AAM is fit to low-resolution images, wherein the number of the pixels in the appearance bias is roughly less than to the number of pixels in the facial area of the training images. Typically high resolution will also refer to the "original" resolution of the image.

The traditional AAM algorithm makes no distinction on the resolution of the test images being fitted. Normally, the traditional AAM is trained on higher resolution images, i.e., the number of the pixels in the appearance bias is roughly equal to the number of pixels in the facial area of the training images. This type of AAM is considered a highRes-AAM. When a highRes-AAM fits to low resolution test images, basically a up-sampling step is involved in interpolating image observation and generates a warped input image I(W (x; P)). As a result a large value J can be computed from the cost function even though the true model parameters are estimated, because of the inherent difficulty of up-sampling. Thus, the fitting cost function tends to be flatter and it is much harder to be minimized compared to fitting highRes-AAM to high-resolution images.

Figure 7:
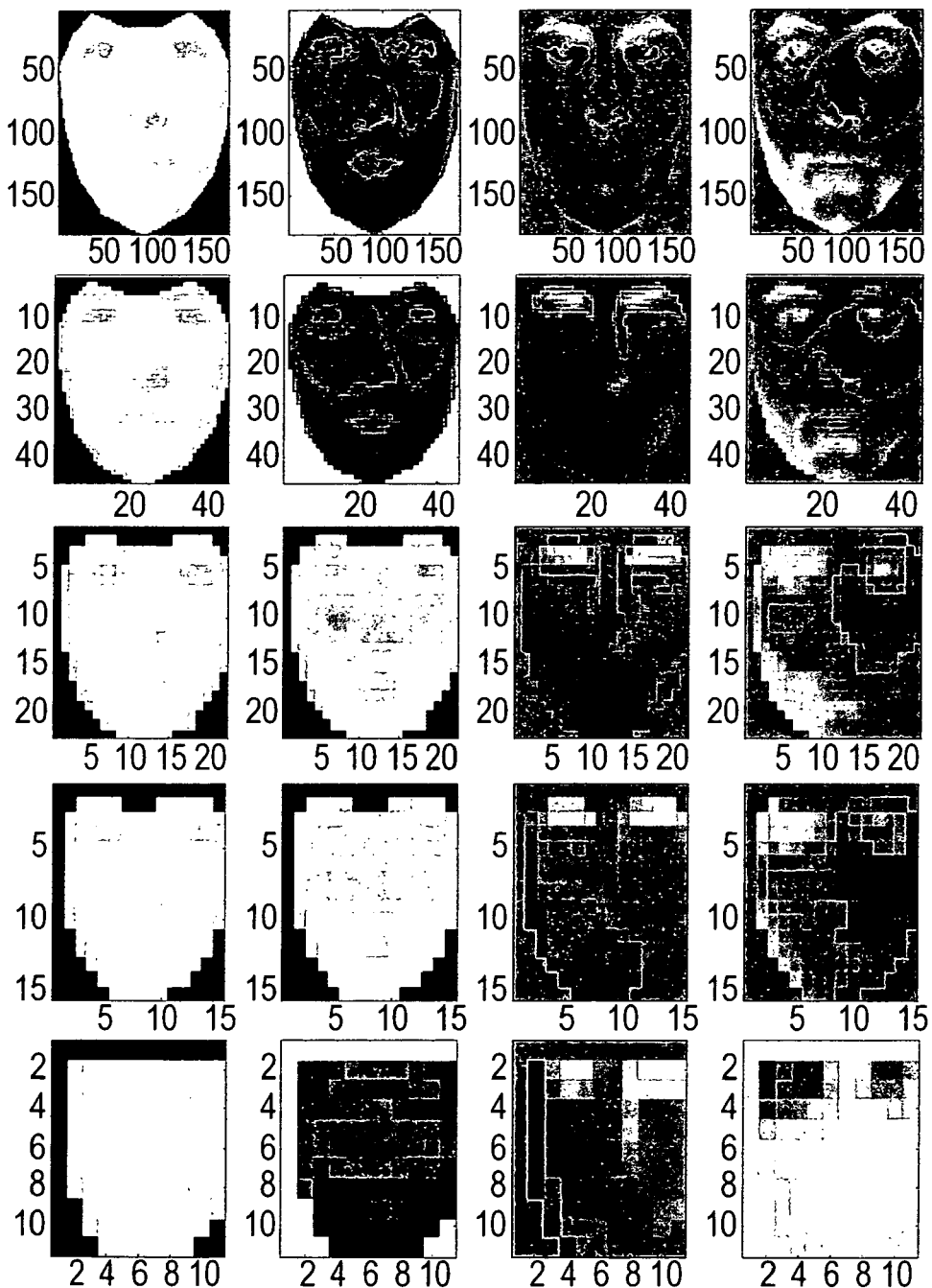
FIG. 7 is an illustration of multi-resolution AAM in accordance with an exemplary embodiment of the invention.
Figure 12:
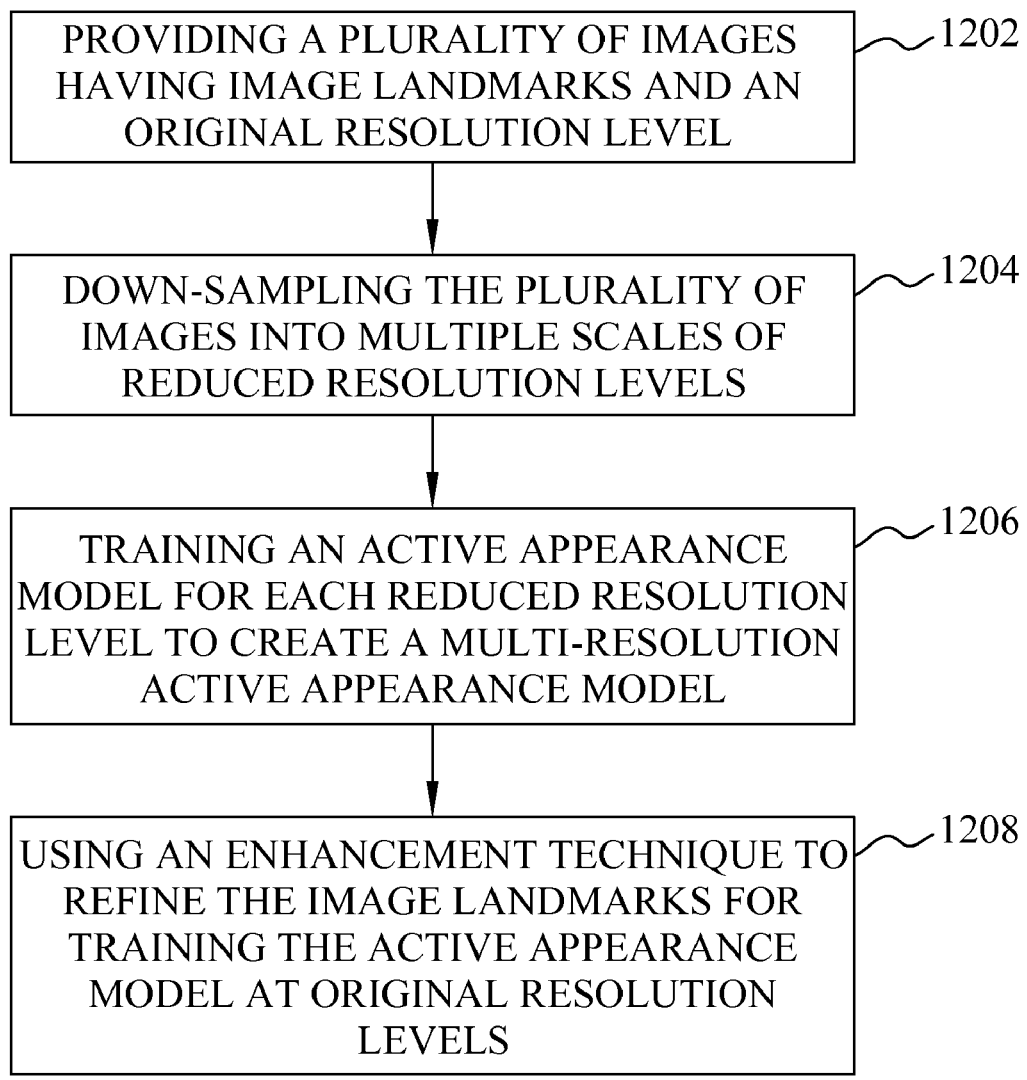
FIG. 12 is an exemplary flow chart illustrating a process for combining images of multiple resolutions to produce an enhanced active appearance model.

In an exemplary implementation, multi-resolution modeling can be applied to AAM. As shown in FIG. 12, a plurality of images having image landmarks and an original resolution level are provided at 1202. At 1204, a given set of low-resolution images is down-sampled into multiple scales of reduced resolution levels. Based on the images at different reduced resolution levels, at 1206, the AAM is trained for each image at each reduced resolution level, thereby creating a pyramid of AAM in multiple resolutions known as multiRes-AAM. For example, FIG. 7 shows the appearance models of the multi-res AAM at resolutions of 1, ¼, ⅛, 1/12, and 1/16. Comparing the AAM at different resolutions within the multi-res AAM, it is appreciated that the AAM at reduced resolution levels have less appearance bias compared to the AAM at higher resolution. Also, AAM at reduced resolution levels has less appearance bias compared to the AAM at higher resolution because the effective pixels to be modeled are much less.

At 1208, the landmarks used for training AAM for the highest resolution can be obtained using the enhancement scheme. The landmarks for other resolutions can be obtained by scaling the landmark at highest resolution with a ratio, such as ¼, ⅛, 1/12, and 1/16. Therefore, the shape models in multi-res AAM can differ in the mean shape up to a scale, while the shape bias for multiple resolutions remain the same.

In an exemplary implementation, the fitting capability of the AAM is tested under various conditions. As described below, the fitting performance of the AAM analyzing a generic database of 534, 2 dimensional (2D) facial images from 200 subjects are tested. This facial dataset is called a generic AAM. A second individual database containing multiple video sequences of one subject, called an individual AAM, is also analyzed.

The ultimate criterion of model enhancement is the improvement in the fitting performance. There are various measurements in evaluating the fitting performance. For example, the convergence rate with respect to different levels of perturbation on the initial landmark location can be used to evaluate the fitting performance. The fitting is converged if the average mean-square-distance between the estimated landmark and the true landmark is less than a certain threshold. Given the known landmark set of one image, it is possible to randomly deviate each landmark within a rectangular area up to a certain range, and the projection of the perturbated landmarks in the shape space is used as the initial shape coefficient. Three different sets of perturbation range is used, 0, $\frac{1}{16}$ and $\frac{1}{8}$ of facial height.

Another factor for the fitting performance tests is the number of images/subjects in the training set. When multiple images of one subject are used for training the AAM, the resultant AAM is considered as individual AAM, which models the shape and appearance variation of the particular subject under different lighting, poses and expressions. When the number of subjects of the training set increases, the resultant AAM is treated as generic AAM. The more subjects, the more generic the AAM becomes. The images in the generic database is modeled at three levels where the number of images is 21, 125, and 534, and the corresponding number of subjects is 5, 25, and 200 respectively.

Figure 8:
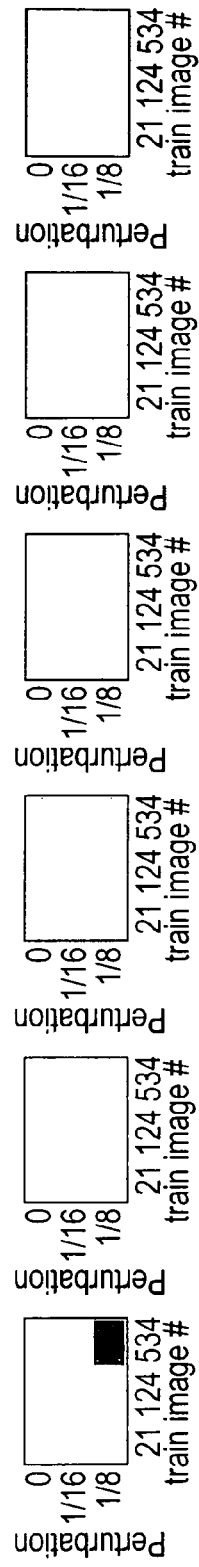
FIG. 8 illustrates plots showing the fitting performance using AAM in accordance with an exemplary embodiment of the invention.

FIG. 8 shows the convergence rate of AAM fitting during the model enhancement. The left plot shows the convergence rate using AAM trained from manually labeled landmarks, with varying levels of generic (horizontally) and amount of perturbation (vertically). Each element represents the convergence rate, which is computed by fitting using the same training set as tested, between 0% and 100% via its brightness. In general there are some non-converged test images when more generic models are fitted with larger perturbation. The remaining plots in FIG. 8 show the convergence rate using AAM in the enhancement iteration No. 1, 4, 7, 10, 13 (from left to right). Continuing improvement of fitting performance can be observed during the enhancement process. After the model enhancement, all test images are converged, no matter how generic the model is and how much amount of perturbation the initialization has.

The table in FIG. 9 shows the computation cost for the fitting performed in FIG. 8. For illustrative purposes, only the fittings using the model trained with manual labels, landmarks from enhancement iteration No. 1, and landmarks from enhancement iteration No. 13 are shown. The cost is averaged across converged fitting based on a computer software modeling implementation running on a conventional computer. After model enhancement, the fitting speed is much faster than the one with manual labeling, as well as the one with only one time iteration.

The fitting performance of multi-res AAM on images with different resolutions is also tested. The same test scheme is used as the above calculations. FIG. 9 shows the results, where each row represents the model resolution varying from $\frac{1}{2}$, $\frac{1}{4}$, $\frac{1}{8}$, $\frac{1}{12}$, to $\frac{1}{16}$, and each column represents the image resolution varying from $\frac{1}{2}$, $\frac{1}{4}$, $\frac{1}{8}$, $\frac{1}{12}$, to $\frac{1}{16}$. For images at certain low resolutions, the best fitting performance is obtained when the model resolution is similar to the facial image resolution, which shows an improvement over fitting using the AAM with the highest model resolution.

Figure 10:
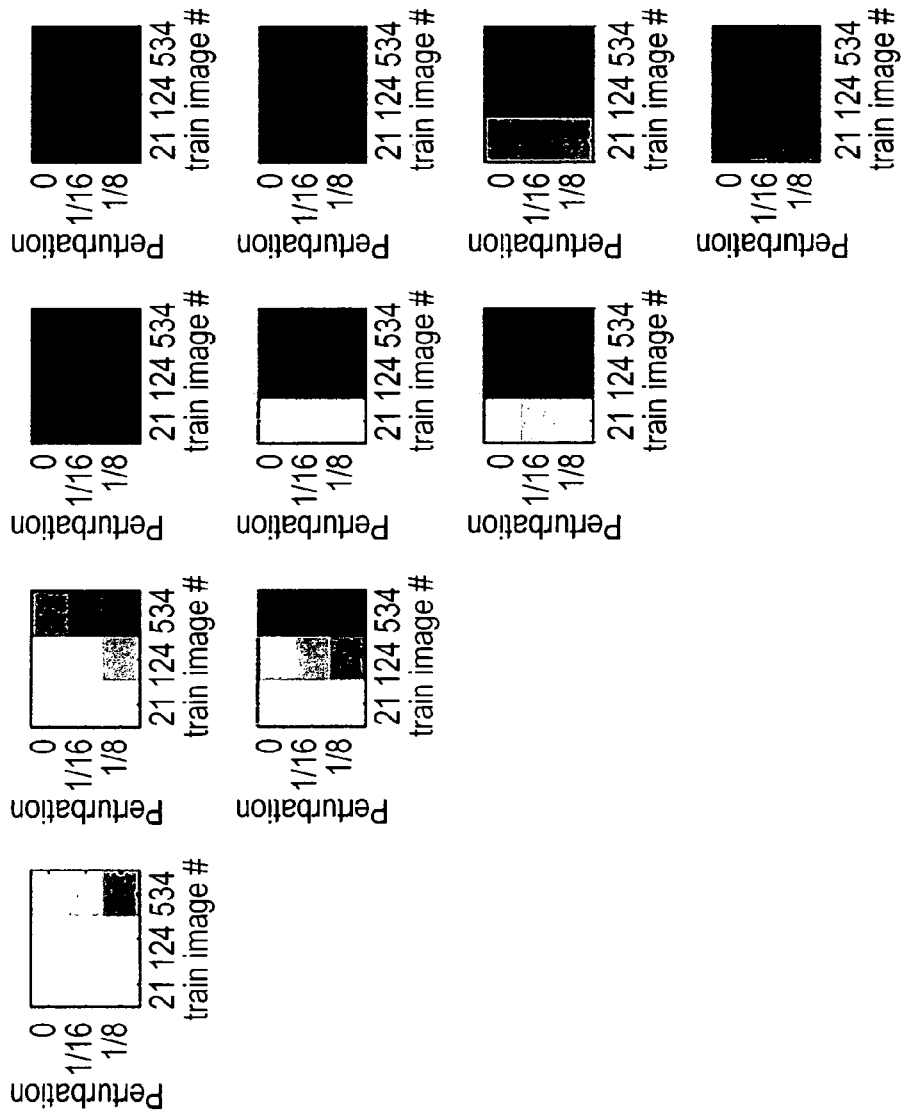
FIG. 10 illustrates plots showing the performance of fitting multi-resolution AAM with different resolutions in accordance with an exemplary embodiment of the invention.
Figure 11:
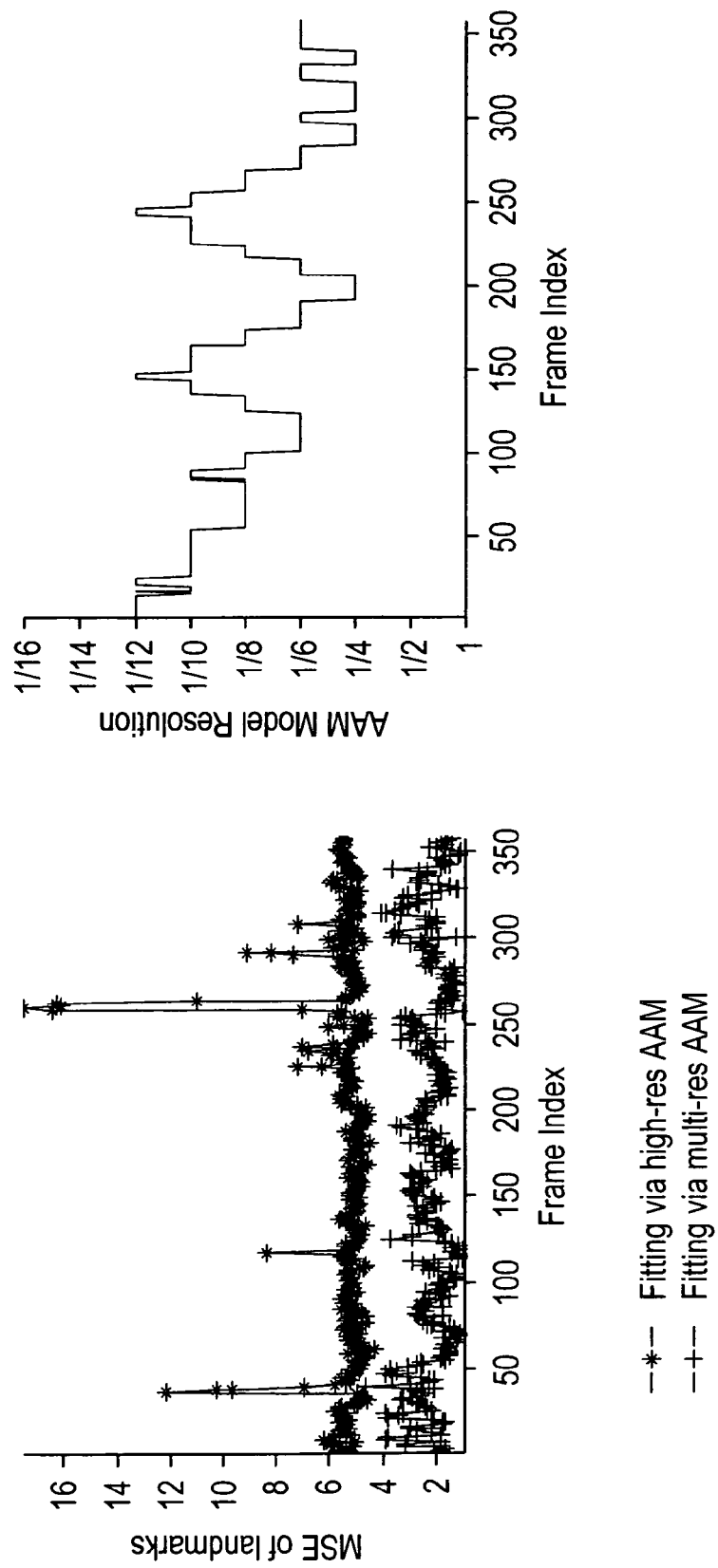
FIG. 11 illustrates graphs showing the mean standard error (MSE) of landmarks for fitting via high-res AAM vs. multi-res AAM in accordance with an exemplary embodiment of the invention.

In another implementation, multi-res AAM can be applied to fitting to a video sequence with varying facial size. Calculations involving eighty facial images from one subject are used to train a multi-res AAM, where model enhancement is utilized to provide the landmark location. Given a test video sequence with varying facial size of the same subject, AAM model fitting is performed on the original frame resolution (648×480) to obtain the ground truth of the landmarks for each frame. The test video is down sampled to $\frac{1}{10}$ of the original resolution and fitted via a multi-res AAM. During the fitting of each frame, one particular AAM is chosen among the AAM pyramid such that the model resolution is slightly larger than the facial resolution in the current frame. The means square error (MSE) between the estimated landmark and the ground truth is used as the performance measure. The fitting performance of the high-res AAM model is plotted in the left graph of FIG. 10. Consistent lower error in landmark estimation is observed using multi-res AAM fitting. The right graph of FIG. 10 shows the model resolution being used for each frame during fitting. The using of multi-res AAM also greatly improves the fitting speed, which takes on average 0.11 second per frame, compared to 5.41 second per frame using the high-res AAM based fitting.

Although the exemplary implementation discusses facial images, it should be understood that the method is not limited to facial images but may be used to model any image. Furthermore, although the above implementation describes images captured on video, it should be understood that the present method is not limited to images captured on video, but may apply to any image that can be processed by a computer, regardless of how it was originally captured.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A method of combining images of multiple resolutions to produce an enhanced active appearance model comprising:
   providing a plurality of images each having image landmarks and each image having an original resolution level;
   down-sampling the plurality of images, via a processor, into multiple scales of reduced resolution levels; and
   training an active appearance model for each reduced resolution level to create a multi-resolution active appearance model;
   wherein an enhancement technique is used to refine the image landmarks for training the active appearance model at original resolution levels, and
   wherein image landmarks used for training the active appearance model for reduced resolution levels are obtained by scaling the image landmarks used at the original resolution levels with a ratio in accordance with the multiple scales.

2. The method according to claim 1, wherein the enhancement technique comprises:
   generating the active appearance model using the plurality of images and their corresponding image landmarks, wherein generating the active appearance model using the plurality of images and their corresponding image landmarks comprises:

fitting the active appearance model to a set of images via an active appearance model fitting process by using a simultaneously inverse compositional algorithm;

generating a new set of image landmarks once the active appearance model fitting process is complete; and repeating the active appearance model fitting process with the new set of image landmarks in multiple iterations until there is no significant difference between the image landmarks of a current iteration and a previous iteration.

3. The method according to claim 1, wherein said down-sampling of images into multiple scales of reduced resolution levels, comprises:

multiplying a sampling time or dividing a sampling rate of an image by a down-sampling factor, wherein the down-sampling factor is an integer or rational fraction greater than one for each multiple scale of reduced resolution.

4. The method according to claim 1, wherein the multi-resolution active appearance model comprises:

down-sampling images into multiple scales of reduced resolution levels and training the active appearance model for each resolution level to create a pyramid of active appearance model trained images.

5. The method according to claim 1, wherein the multi-resolution active appearance model comprises:

a shape model and an appearance model, wherein a distribution of facial landmarks are modeled as a Gaussian distribution to create the shape model wherein any image shape can be represented as $$s(P) = s_0 + \sum_{i=0}^{n} p_i s_i,$$

where $s_0$ is a mean shape, $s_i$ is a shape bias, and $P=[p_1, p_2, \ldots, p_n]$ is a shape coefficient, and after the shape model is trained, the appearance model is obtained after each image is warped into the mean shape based on a piece-wise affine transformation between an instant image shape and the mean image shape, wherein a shape-normalized appearance from all training images are fed into an eigenanalysis such that a resultant model can represent any image appearance as $$A(x; \lambda) = A_0(x) + \sum_{i=0}^{m} \lambda_i A_i(x),$$

where $A_0$ is a mean appearance, x is a pixel coordinate, $A_i$ is an appearance bias, and $\lambda=[\lambda_1, \lambda_2, \ldots, \lambda_n]$ is an appearance coefficient.

6. The method according to claim 1, wherein the enhancement technique produces an output digital image that is more compact and requires less storage space.

7. The method according to claim 1, wherein the plurality of images contain landmarks that are manually fitted to each of the plurality of images image.

8. The method according to claim 1, wherein the enhancement technique is used to produce a single image of improved quality.

9. The method according to claim 8, wherein the single image has reduced image noise.

10. An image processing system for combining digital images of multiple resolution levels to produce an enhanced active appearance model, the system comprising:

a general purpose computer having a memory;

a plurality of digital images residing in the memory, each of the plurality of digital images having image landmarks and each of the plurality of digital images having an original resolution level;

a first process residing in the memory, the first process having instructions to down-sample the plurality of digital images into multiple scales of reduced resolution levels; and a second process residing in the memory, the second process having instructions to align an active appearance model for each reduced resolution level to create a multi-resolution active appearance model, wherein an enhancement technique is used to refine the image landmarks for aligning the active appearance model at the original resolution level, and wherein image landmarks used for aligning the active appearance model for reduced resolution levels are obtained by scaling image landmarks used at the original resolution levels with a ratio in accordance with the multiple scales.

11. The image processing system according to claim 10, comprising a third process having instructions to:

generate the active appearance model via an active appearance model alignment by processing the plurality of digital images and their corresponding image landmarks, using a simultaneously inverse compositional method to align the active appearance model to a set of images;

generate a new set of image landmarks once the active appearance model is aligned; and repeat multiple iterations of the active appearance model alignment process with the new set of image landmarks until there is no significant difference between image landmarks of a current iteration and a previous iteration.

12. The image processing system according to claim 10, wherein the first process further comprises instructions in the memory of the general purpose computer to perform at least one of a multiplication of a sampling time or a division of a sampling rate of a digital image by a down-sampling factor, wherein the down-sampling factor is an integer or rational fraction greater than one for each multiple scale of reduced resolution.

13. The image processing system according to claim 10, wherein the first process down-samples images into multiple scales of reduced resolution levels and aligns the active appearance model for each resolution level to create a pyramid of active appearance model aligned images.

14. The image processing system according to claim 10, wherein each of the plurality of digital images contain image landmarks that are manually fitted to each of the plurality of digital images.

15. The image processing system according to claim 10, wherein the enhancement technique produces a single image of improved quality.

16. The image processing system according to claim 15, wherein the single image has reduced image noise.

17. A method operable in a computer-readable medium having a technical effect of combining images of multiple resolutions to produce an enhanced active appearance model method, the method comprising:

processing a plurality of images, each of the plurality of images having image landmarks and each of the plurality of images having an original resolution level;

down-sampling each of the plurality of images, via a processor, into multiple scales of reduced resolution levels; and training an active appearance model for each reduced resolution level to create a multi-resolution active appearance;

wherein, an enhancement technique is used to obtain image landmarks for training the active appearance model at original resolution levels, and wherein image landmarks used for training the active appearance model for reduced resolution levels are obtained by scaling image landmarks used at the original resolution levels with a ratio in accordance with the multiple scales.

18. The method operable in a computer-readable medium according to claim 17, wherein the enhancement technique comprises:

generating the active appearance model using the plurality of images and their corresponding image landmarks, wherein generating the active appearance model using the plurality of images and their corresponding image landmarks comprises:

using a simultaneously inverse compositional algorithm in an active appearance model fitting process to fit the active appearance model to a set of images, generating a new set of image landmarks once the active appearance model fitting process is complete, and repeating the active appearance model fitting process with the new set of image landmarks in multiple iterations until there is no significant difference between the image landmarks of a current iteration and a previous iteration.

19. The method operable in a computer-readable medium according to claim 17, wherein the multi-resolution active appearance model comprises, a shape model and an appearance model, wherein a distribution of facial landmarks are modeled as a Gaussian distribution to create the shape model wherein any image shape can be represented as $$s(P) = s_0 + \sum_{i=0}^{n} p_i s_i,$$

where $s_0$ is a mean shape, $s_i$ is a shape bias, and $P=[p_1, p_2, \ldots, p_n]$ is a shape coefficient, and after the shape model is trained, the appearance model is obtained after each image is warped into the mean shape based on a piece-wise affine transformation between an instant image shape and the mean image shape, wherein a shape-normalized appearance from all training images are fed into an eigenanalysis such that a resultant model can represent any image appearance as $$A(x; \lambda) = A_0(x) + \sum_{i=0}^{m} \lambda_i A_i(x),$$

where A0 is a mean appearance, x is a pixel coordinate, Ai is an appearance bias, and $\lambda=[\lambda 1, \lambda 2, \ldots, \lambda n]$ is an appearance coefficient.

20. The method operable in a computer-readable medium according to claim 19, wherein the enhancement technique produces an output digital image that is more compact and requires less storage space.

* * * * *